US00RE44700E

(19) United States
(12) Reissued Patent
Berger et al.

(10) Patent Number: US RE44,700 E
(45) Date of Reissued Patent: Jan. 14, 2014

(54) SEAT DECK ASSEMBLY OR COMPARTMENT COVER FOR A MATERIALS HANDLING VEHICLE

(75) Inventors: Ryan R. Berger, Columbus, OH (US); Michael P. Gallagher, Greenville, OH (US); John P. Jones, Celina, OH (US); Thornton K. Lothrop, Worthington, OH (US); Donald E. Luebrecht, Ft. Jennings, OH (US); Rainer B. Teufel, Worthington, OH (US); Juergen Buchmann, Duisburg (DE); Edgar Wahnemuehl, Duisburg (DE)

(73) Assignee: Crown Equipment Corporation, New Bremen, OH (US)

(21) Appl. No.: 13/071,216

(22) Filed: Mar. 24, 2011

Related U.S. Patent Documents

Reissue of:
(64) Patent No.: 7,871,117
Issued: Jan. 18, 2011
Appl. No.: 11/747,333
Filed: May 11, 2007

U.S. Applications:
(60) Provisional application No. 60/799,895, filed on May 12, 2006.

(51) Int. Cl.
*B62D 39/00* (2006.01)

(52) U.S. Cl.
USPC ..... 296/65.05; 180/89.17; 296/190.01; 296/136.01

(58) Field of Classification Search
USPC ..... 296/65.05, 65.01, 190.08, 190.01; 172/431, 435, 436; 180/89.1, 89.13, 180/89.14, 89.17; 297/331, 334
See application file for complete search history.

(56) References Cited

U.S. PATENT DOCUMENTS

| | | | |
|---|---|---|---|
| 3,583,518 | A | 6/1971 | Bichel et al. |
| 4,025,108 | A | 5/1977 | Leighty et al. |
| 4,047,750 | A | 9/1977 | Samide |
| 4,364,602 | A | 12/1982 | Rigazio |
| 4,619,479 | A | 10/1986 | Martin, Jr. |
| 4,770,263 | A | 9/1988 | Yoshioka |
| 4,785,900 | A | 11/1988 | Nasky |
| 5,524,721 | A | 6/1996 | Yamauchi |
| 5,524,722 | A | 6/1996 | Bowman et al. |
| 6,296,221 | B1 | 10/2001 | Nadeau |
| 6,578,651 | B2 | 6/2003 | Murase |
| 7,014,255 | B2 | 3/2006 | Amamiya et al. |
| 2005/0255377 | A1 | 11/2005 | Kondo |

FOREIGN PATENT DOCUMENTS

| | | | |
|---|---|---|---|
| GB | 163452 | A | 5/1921 |
| JP | 11240698 | A | 7/1999 |

OTHER PUBLICATIONS

Zhu, Haitao; CCPIT Patent and Trademark Law Office; Letter dated Jan. 18, 2011 reporting the first Office Action issued by the Chinese Patent Office on Dec. 28, 2010.

Fan, Oixia; First Office Action; Application No. 200780017339.0; Chinese Patent Office; Dec. 28, 2010.

*Primary Examiner* — Glenn Dayoan
*Assistant Examiner* — Melissa A Black
(74) *Attorney, Agent, or Firm* — Stevens & Showalter LLP

(57) ABSTRACT

A materials handling vehicle is provided. The vehicle comprises a main body, a seat deck assembly including an operator seat, and structure for movably mounting the seat deck assembly to the main body. The seat deck assembly moves relative to the main body along a varying radius path.

22 Claims, 21 Drawing Sheets

SEAT DECK ASSEMBLY OR COMPARTMENT COVER FOR A MATERIALS HANDLING VEHICLE

Matter enclosed in heavy brackets [ ] appears in the original patent but forms no part of this reissue specification; matter printed in italics indicates the additions made by reissue.

This application claims the benefit of U.S. Provisional Application No. 60/799,895, filed May 12, 2006 and entitled "SEAT DECK ASSEMBLY OR COMPARTMENT COVER FOR A MATERIALS HANDLING VEHICLE," the disclosure of which is incorporated herein by reference.

BACKGROUND OF THE INVENTION

1. Field of the Invention

This invention relates in general to seat deck assemblies or compartment covers for use in materials handling vehicles and, more particularly, to such a seat deck assembly or compartment cover that is adapted to move along a varying radius path to allow improved access to a compartment positioned below the seat deck assembly or compartment cover.

2. Background Information

Seat deck assemblies for use on materials handling vehicles are known in the prior art. One such prior art seat deck assembly comprises a frame and an operator seat coupled to the frame. The frame is pivotably mounted to a main body of a materials handling vehicle by spaced-apart pivot pins located along a common pivot axis. It is believed that the seat deck assembly moves through a constant radius path or arc no greater than about 85.5 degrees when traveling back and forth between closed and open positions. When in a down position, the seat deck assembly covers a compartment positioned beneath it. It has been found that the constant radius arc limits where other structure, e.g., a steering wheel and a rear panel, may be located within the truck relative to the constant radius path of the seat deck assembly.

Accordingly, there is a need for an improved mounting arrangement for a seat deck assembly or compartment cover.

SUMMARY OF THE INVENTION

This need is met by the present invention, wherein structure is provided for movably mounting a seat deck assembly or compartment cover to a materials handling vehicle main body such that the seat deck assembly or compartment cover moves along a varying radius path. In an illustrated embodiment, movement along a varying radius path allows the seat deck assembly to avoid, during its movement, striking a steering wheel, B-posts and a rear cover positioned behind the seat deck assembly. The seat deck assembly or compartment cover can traverse an angle preferably greater than about 87 degrees, more preferably, greater than about 90 degrees, and most preferably, between about 92 degrees and about 99 degrees during movement along a varying radius path, so as to maximize operator access to a compartment found beneath the seat deck assembly or compartment cover. The seat deck assembly is preferable provided with at least one recessed section to allow improved ingress and egress to an operator's compartment.

In accordance with a first aspect of the present invention, a materials handling vehicle comprises a main body, a seat deck assembly including an operator seat, and structure for movably mounting the seat deck assembly to the main body such that the seat deck assembly moves relative to the main body along a varying radius path.

The structure for movably mounting the seat deck assembly to the main body may comprise at least one fixed bracket mounted to the main body; at least one movable bracket coupled to the seat deck assembly; and at least one linkage assembly coupled to the fixed and movable brackets.

The linkage assembly may comprise at least one four-bar linkage. The four-bar linkage may comprise a frame link defined by a portion of the fixed bracket; a first substantially linear grounded link; a second grounded link having an angled portion; and a coupler link defined by a portion of the movable bracket. Each of the first and second grounded links is coupled to the frame and coupler links.

The main body may comprise a base, first and second B-posts fixedly coupled to the base, and a cross member extending between and fixedly coupled to the first and second B-posts.

First and second fixed brackets may be fixed to the cross member, first and second movable brackets may be coupled to the seat deck assembly and first and second linkage assemblies may be provided. The first linkage assembly may be coupled to the first fixed bracket and the first movable bracket and the second linkage assembly may be coupled to the second fixed bracket and the second movable bracket.

The seat deck assembly may further comprise a frame coupled to the first and second movable brackets, and a cover coupled to the frame. The operator seat is coupled to the frame.

The materials handling vehicle may further comprise a fork assembly coupled to the main body.

In accordance with a second aspect of the present invention, a materials handling vehicle is provided comprising a main body, a seat deck assembly including an operator seat, and structure for movably mounting the seat deck assembly to the main body such that the seat deck assembly traverses through an angle greater than about 87 degrees when traveling between closed and open positions so as to allow optimal access to a compartment positioned beneath the seat deck assembly.

The structure for movably mounting the seat deck assembly to the main body may comprise at least one fixed bracket mounted to the main body, at least one movable bracket mounted to the seat deck assembly, and at least one linkage assembly coupled to the fixed and movable brackets.

The linkage assembly preferably allows the seat deck assembly to traverse through an angle from about 92 degrees to about 99 degrees when moving from a closed position to an open position.

The linkage assembly may comprise at least one four-bar linkage.

The cover may have side portions which are low in profile height near an end of the frame coupled to the movable bracket and tall in profile height near an end of the frame opposite the end coupled to the movable bracket.

In accordance with a third aspect of the present invention, a materials handling vehicle is provided comprising a main body, a seat deck assembly and structure for mounting the seat deck assembly to the main body. The seat deck assembly may include a frame, a cover coupled to the frame and an operator seat. Preferably, the cover of the seat deck assembly includes a curved recessed front section. The curved section may be defined by upper and lower inwardly curved portions, wherein the upper portion extends at an angle to the lower curved portion.

In accordance with a fourth aspect of the present invention, a materials handling vehicle is provided comprising a main body having a compartment, a cover assembly for the compartment, and structure for movably mounting the cover assembly to the main body such that the cover assembly moves relative to the main body along a varying radius path.

The structure for movably mounting the cover assembly to the main body comprises at least one fixed bracket mounted to the main body, at least one movable bracket mounted to the cover assembly, and at least one four-bar linkage assembly coupled to the fixed and movable brackets.

Preferably, the cover assembly traverses through an angle from about 92 degrees to about 99 degrees when traveling between closed and open positions so as to allow maximum access to the compartment positioned beneath the cover assembly.

DETAILED DESCRIPTION OF THE INVENTION

Figure 1:
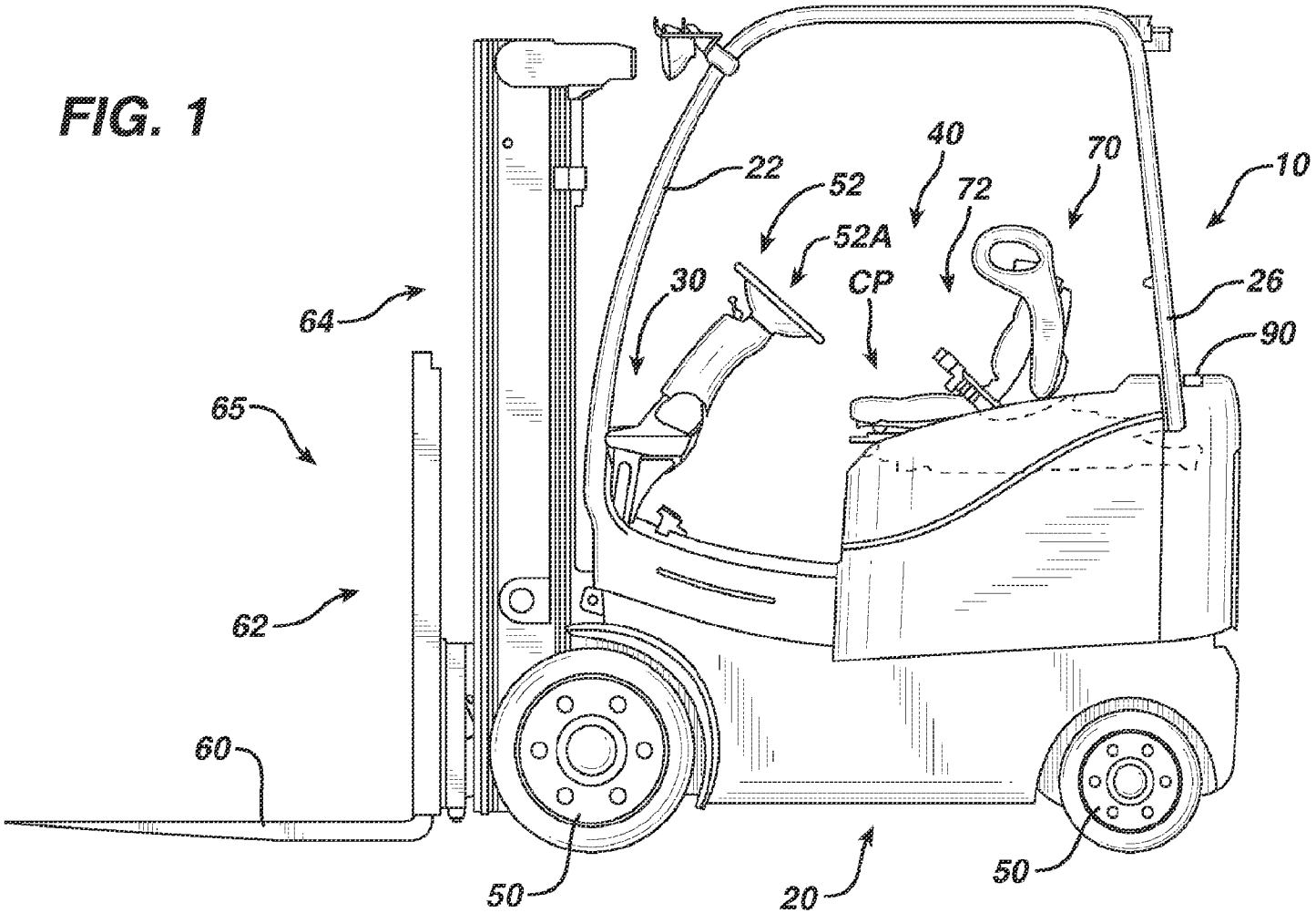
FIG. 1 is a side view of a materials handling vehicle having a seat deck assembly, shown in a closed position, wherein the vehicle is constructed in accordance with a first embodiment of the present invention.
Figure 2:
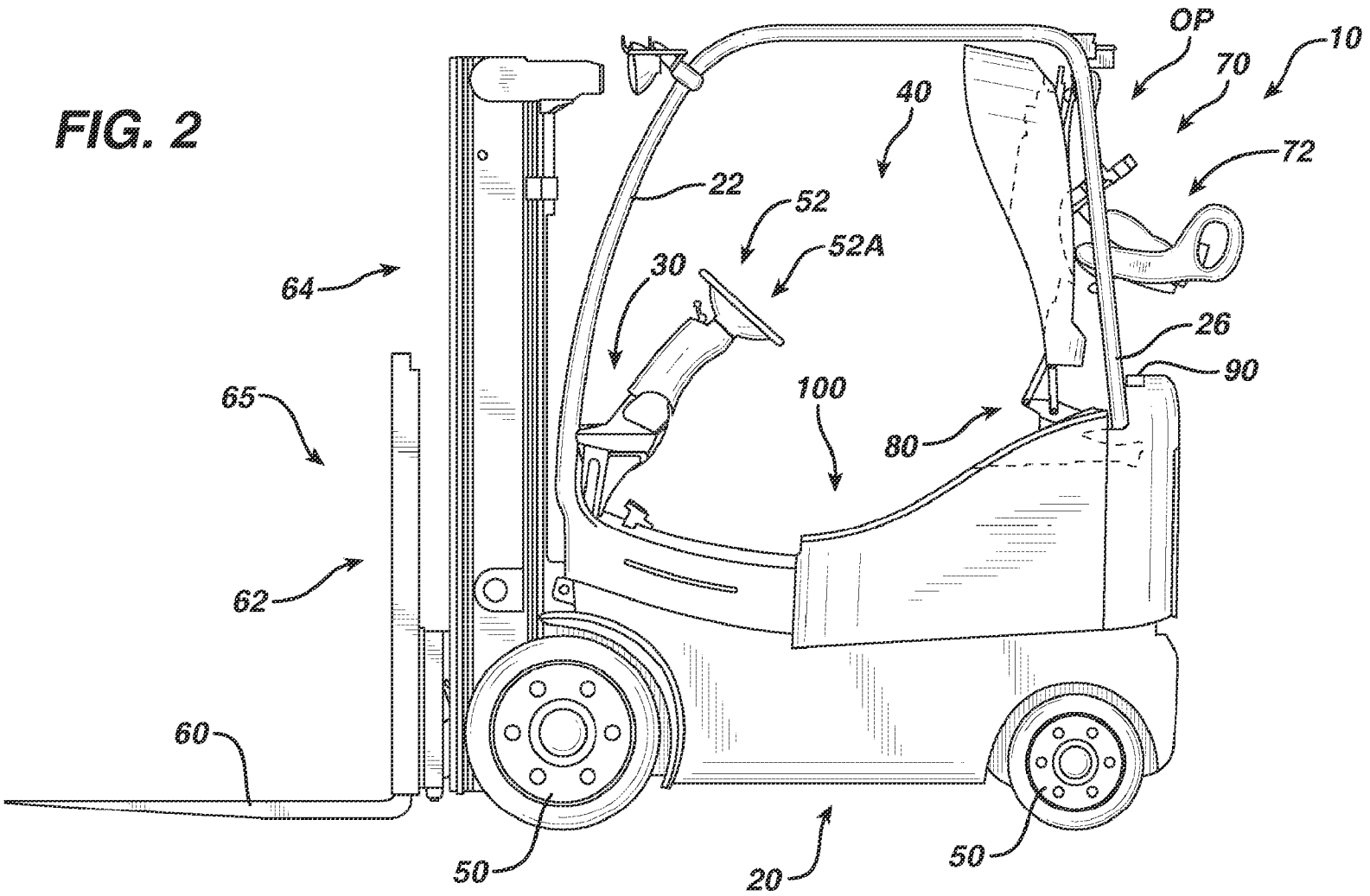
FIG. 2 is a side view of the materials handling vehicle illustrated in FIG. 1 with the seat deck assembly shown in an open position.

Reference is now made to FIGS. 1 and 2, which illustrate a materials handling vehicle comprising a fork lift truck 10 constructed in accordance with a first embodiment of the present invention. The truck 10 comprises a main body or frame 20 having a cowl 30 located forward of an operator's compartment 40 and near first and second substantially tubular A-posts (only the first A-post 22 is illustrated in FIGS. 1 and 2) of the main body 20, i.e., the cowl 30 is the front portion of the main body 20 located forward of the operator's compartment 40 and adjacent the A-posts. The main body 20 also comprises first and second substantially tubular B-posts (only the first B-post 26 is illustrated in FIGS. 1 and 2). Four wheels 50 are provided, only two of which are illustrated in FIGS. 1 and 2. At least one wheel 50 is driven and at least one wheel 50 is steerable. Extending into the operator's compartment 40 is a steering wheel assembly 52 including a steering wheel 52A for effecting steering of the steerable wheel(s). A pair of forks 60 are mounted on a fork carriage mechanism 62 which, in turn, is coupled to an extensible mast assembly 64. The forks 60, fork carriage mechanism 62 and mast assembly 64 define a fork assembly 65 coupled to the main body 20. The operator's compartment 40 comprises a movable seat deck assembly 70 including a seat 72 for receiving an operator. In the illustrated embodiment, the seat 72 is capable of being rotated in a generally horizontal plane in at least one direction to allow an operator to more easily view a path of travel when the truck 10 is driven in reverse, i.e., in a direction away from the forks 60.

In accordance with the present invention, the seat deck assembly 70 is mounted to the main body 20 via structure 80 so as to allow the seat deck assembly 70 to move back and forth between a closed position CP, shown in FIG. 1, and a fully open position OP, shown in FIG. 2. A rear cover 90 is positioned directly behind the seat deck assembly 70.

Figure 3:
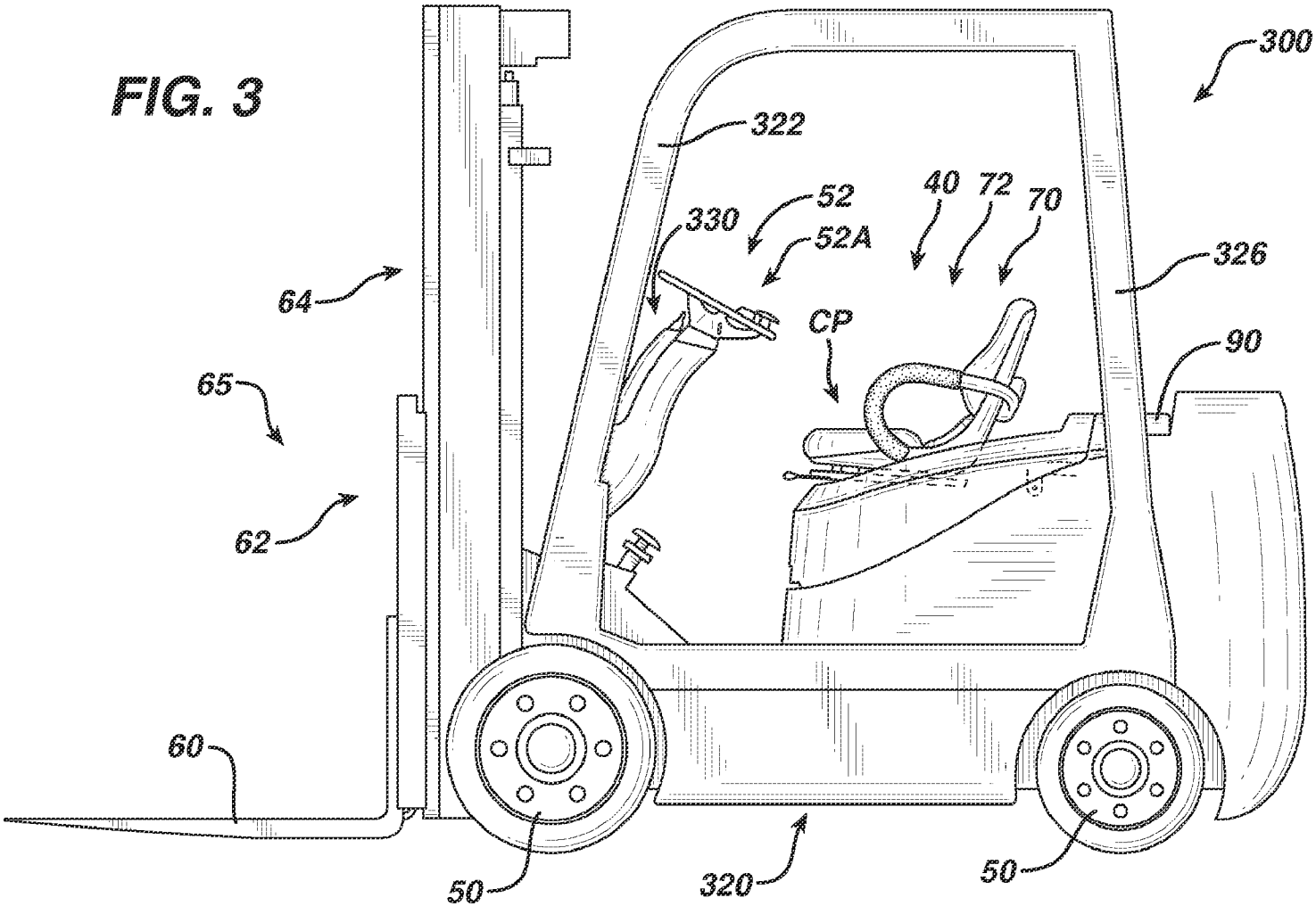
FIG. 3 is a side view of a materials handling vehicle having a seat deck assembly, shown in a closed position, wherein the vehicle is constructed in accordance with a second embodiment of the present invention.
Figure 4:
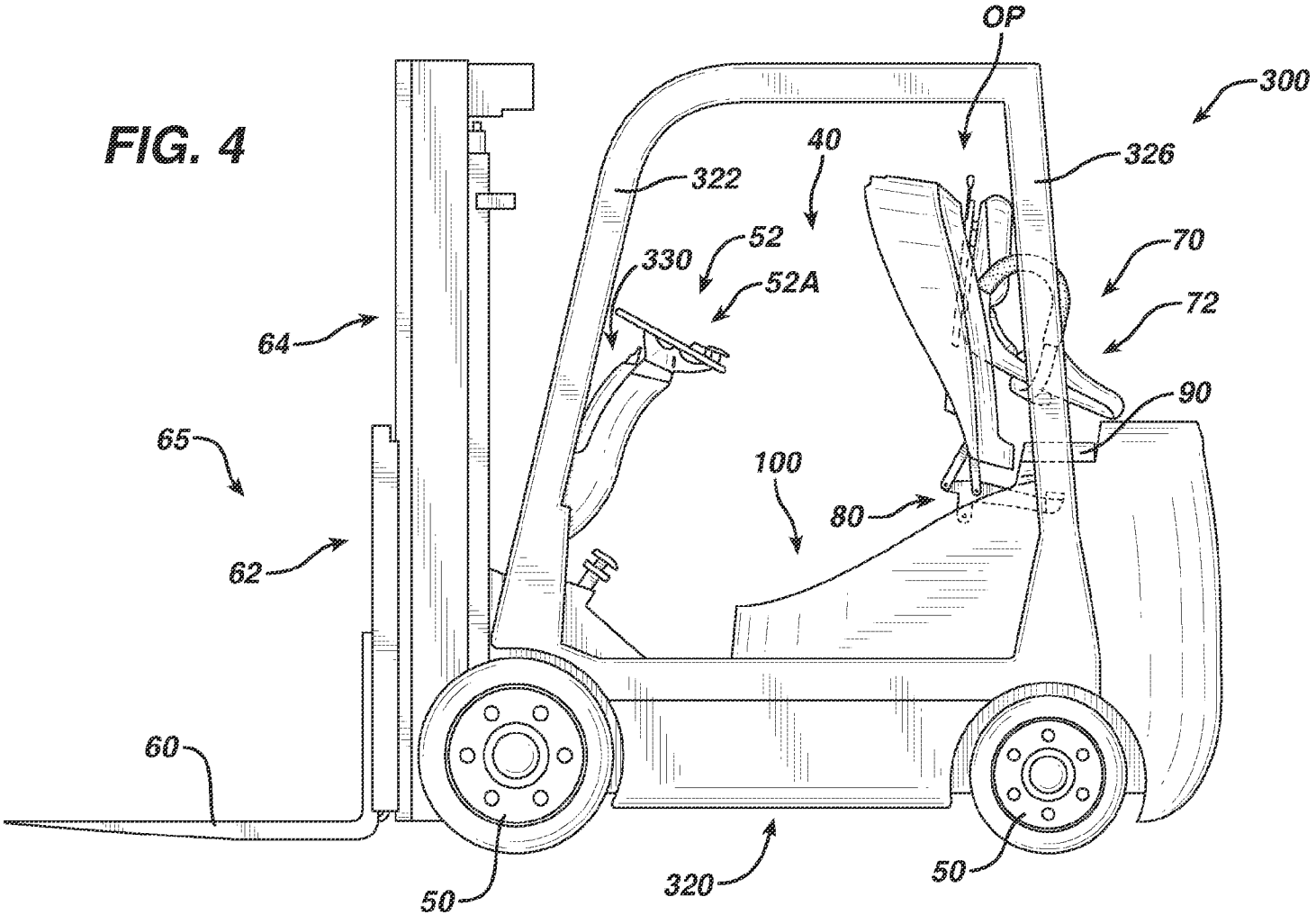
FIG. 4 is a side view of the materials handling vehicle illustrated in FIG. 3 with the seat deck assembly shown in an open position.

A materials handling vehicle comprising a fork lift truck 300 constructed in accordance with a second embodiment of the present invention is illustrated in FIGS. 3 and 4, where like reference numerals indicate like elements. The truck 300 comprises a main body or frame 320 having a cowl 330 located forward of an operator's compartment 40 and near first and second substantially rectangular A-posts 322 and 324, see FIGS. 3, 4 and 10, of the main body 320, i.e., the cowl 330 is the front portion of the main body 320 located forward of the operator's compartment 40 and adjacent the A-posts 322 and 324. The main body 20 also comprises first and second substantially rectangular B-posts 326 and 328, see FIGS. 3, 4 and 10. Four wheels 50 are provided, only two of which are illustrated in FIGS. 3 and 4. At least one wheel 50 is driven and at least one wheel 50 is steerable. Extending into the operator's compartment 40 is a steering wheel assembly 52 including a steering wheel 52A for effecting steering of the steerable wheel(s). A pair of forks 60 are mounted on a fork carriage mechanism 62 which, in turn, is coupled to an extensible mast assembly 64. The forks 60, fork carriage mechanism 62 and mast assembly 64 define a fork assembly 65 coupled to the main body 320. The operator's compartment 40 comprises a movable seat deck assembly 70 including a seat 72 for receiving an operator. In the illustrated embodiment, the seat 72 is capable of being rotated in a generally horizontal plane in at least one direction to allow an operator to more easily view a path of travel when the truck 10 is driven in reverse, i.e., in a direction away from the forks 60.

The seat deck assembly 70 provided on the truck 10 illustrated in FIGS. 1 and 2 is constructed in generally the same manner as the seat deck assembly 70 provided on the truck 320 illustrated in FIGS. 3 and 4. A description of the seat deck assembly 70 provided on the truck 320 is set out below. This description of the seat deck assembly 70 provided on the truck 320 applies as well to the seat deck assembly 70 provided on the truck 10.

Figure 11:
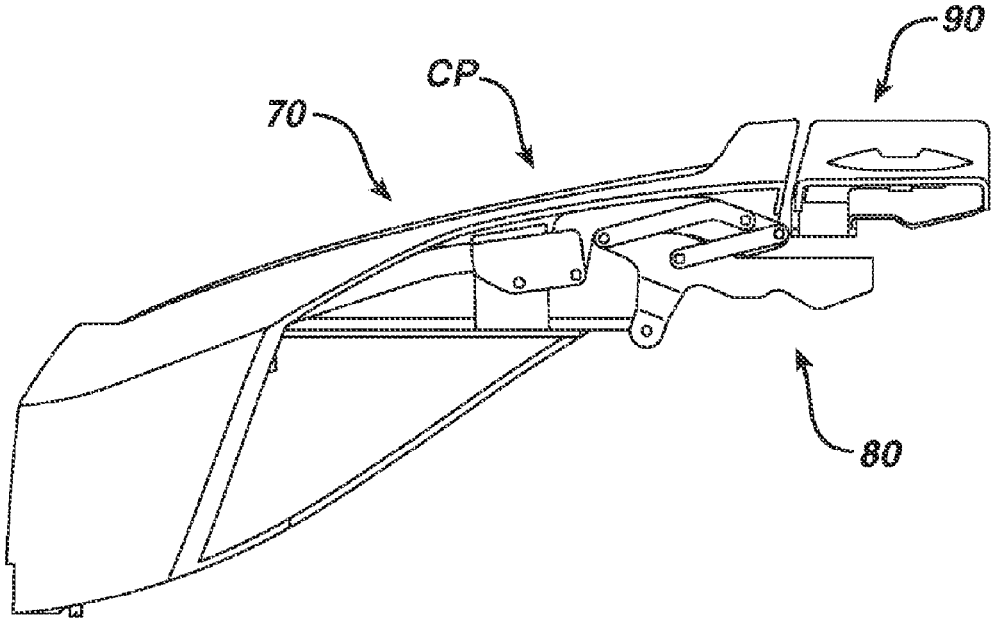
FIG. 11 is a side view, partially in cross section, of the seat deck assembly in a closed position.
Figure 12:
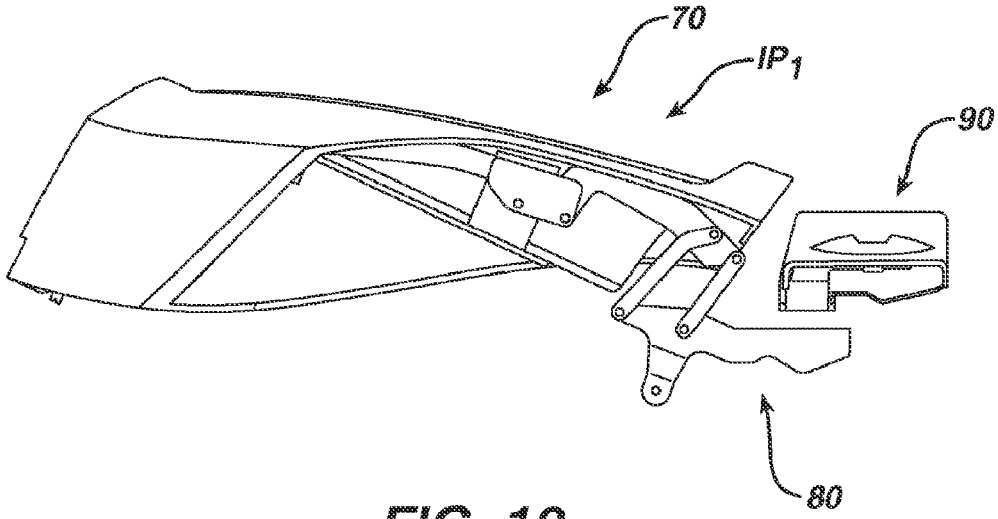
FIG. 12 is a side view, partially in cross section, of the seat deck assembly in a first intermediate position.
Figure 13:
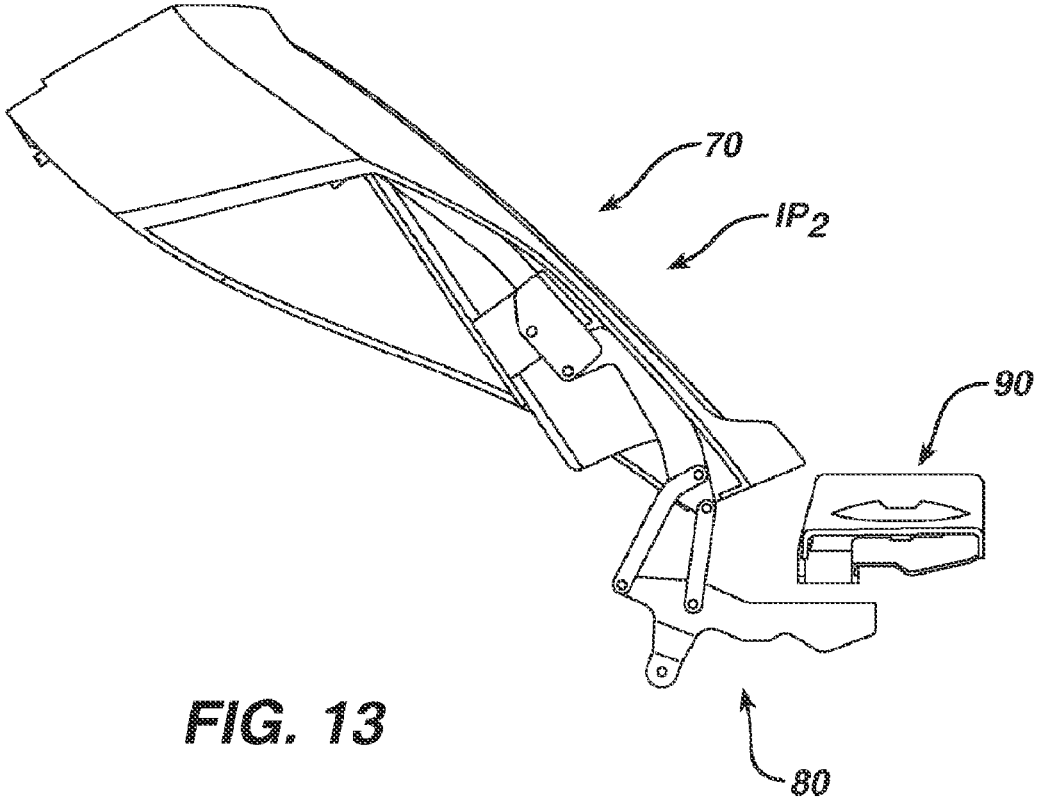
FIG. 13 is a side view, partially in cross section, of the seat deck assembly in a second intermediate position.
Figure 14:
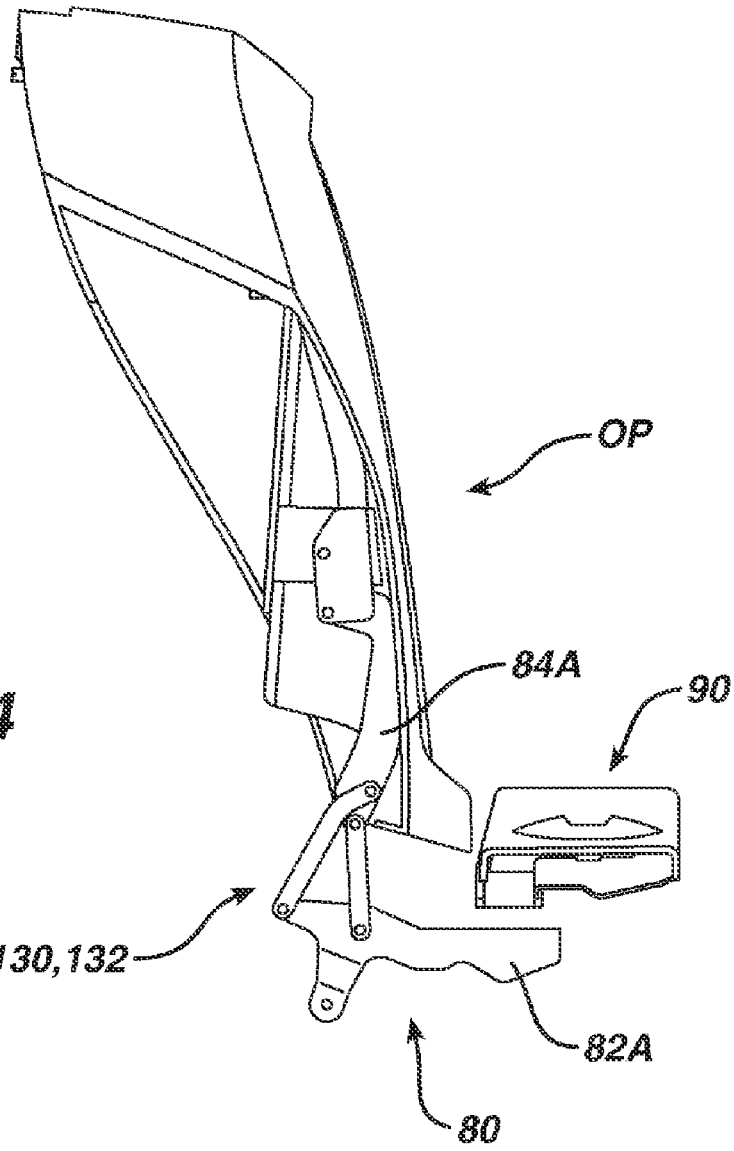
FIG. 14 is a side view, partially in cross section, of the seat deck assembly in a fully open position.
Figure 15:
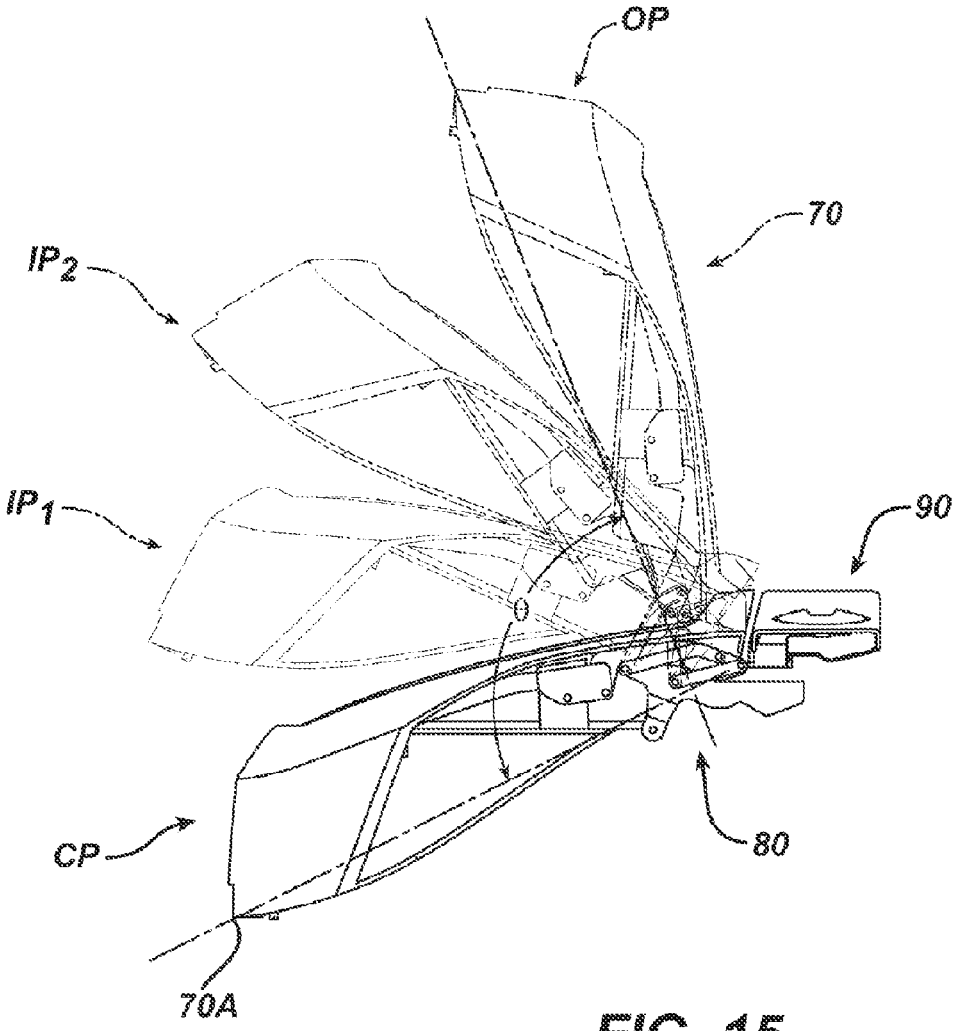
FIG. 15 is a view illustrating the seat deck assembly in its first and second intermediate positions and fully open position superimposed on the seat deck assembly in its closed position.

In accordance with the present invention, the seat deck assembly 70 is mounted to the main body 320 via structure 80 so as to allow the seat deck assembly 70 to move back and forth between a closed position CP, shown in FIGS. 3 and 11, and a fully open position OP, shown in FIGS. 4 and 14. In the illustrated embodiment, when moving from its closed position CP to its fully open position OP and, vice versa, the seat deck assembly 70 travels along a varying radius path. The seat deck assembly 70 is shown in a first intermediate position $IP_1$ in FIGS. 12 and 15 and a second intermediate position $IP_2$ in FIGS. 13 and 15. FIG. 15 illustrates the first and second intermediate positions $IP_1$ and $IP_2$ and the fully open position OP superimposed on the closed position CP.

The varying radius path allows the seat deck assembly 70 to move within a very compact volume so as not to strike the steering wheel 52A, the main body B-posts 326 and 328 or the rear cover 90 positioned directly behind the seat deck assembly 70, see FIGS. 3 and 4.

As illustrated in FIG. 15, the seat deck assembly 70 includes a distal or front outer edge 70A. In the illustrated embodiment, when the seat deck assembly 70 moves along the varying radius path from its closed position CP to its open position OP and vice versa, the front edge 70A traverses through an angle theta of about 97.5 degrees. Hence, full or optimal access is provided to a compartment 100, see FIG. 4, which is at least partially covered by the seat deck assembly 70 when the assembly 70 is in its closed position CP. For the truck 300 illustrated in FIGS. 3 and 4, the compartment 100 may comprise an internal combustion engine or a hybrid propulsion system compartment. For the truck 10 illustrated in FIGS. 1 and 2, the compartment 100 may comprise a battery or fuel cell compartment. Consequently, service technicians can easily access structure, e.g., a battery, fuel cell, engine and/or motor, found within the compartment 100 with the seat deck assembly 70 in its fully open position OP. The angle theta through which the seat deck assembly 70 and its front edge 70A traverse may have a value other than 97.5 degrees. Preferably, the angle theta is greater than about 87 degrees, more preferably, greater than about 90 degrees, and most preferably, between about 92 degrees and about 99 degrees. It is contemplated that an upper limit for the angle theta may comprise about 165 degrees. Hence, the angle theta may fall within a range of from about 87 degrees to about 165 degrees and all ranges subsumed therein.

The main body 320 further comprises a cross member 120 and first and second L-shaped brackets 122A and 122B. The first bracket 122A is welded to the second B-post 328, see FIGS. 5 and 10. The second bracket 122B is welded to the first B-post 326, see FIGS. 5, 6 and 10. The cross member 120 extends between and is bolted to the first and second brackets 122A and 122B so as to be fixedly coupled to the first and second B-posts 326 and 328, see FIGS. 5, 6 and 10.

Figure 5:
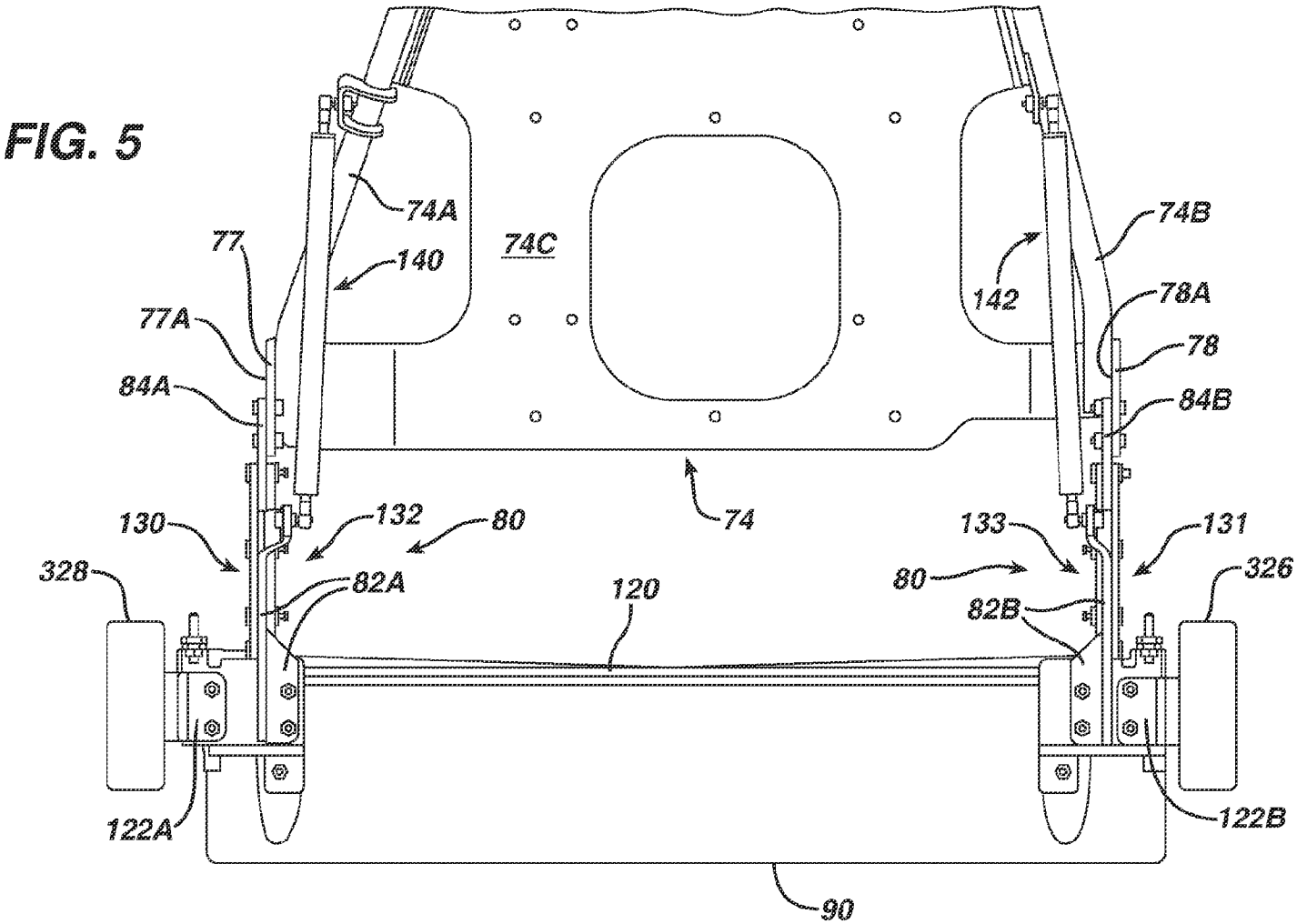
FIG. 5 is a view, partially in cross section, of an underside of the seat deck assembly of the vehicle illustrated in FIGS. 3 and 4, a portion of a main body of the vehicle and the structure for movably mounting the seat deck assembly to the vehicle main body and wherein the cover of the seat deck assembly is removed.
Figure 6:
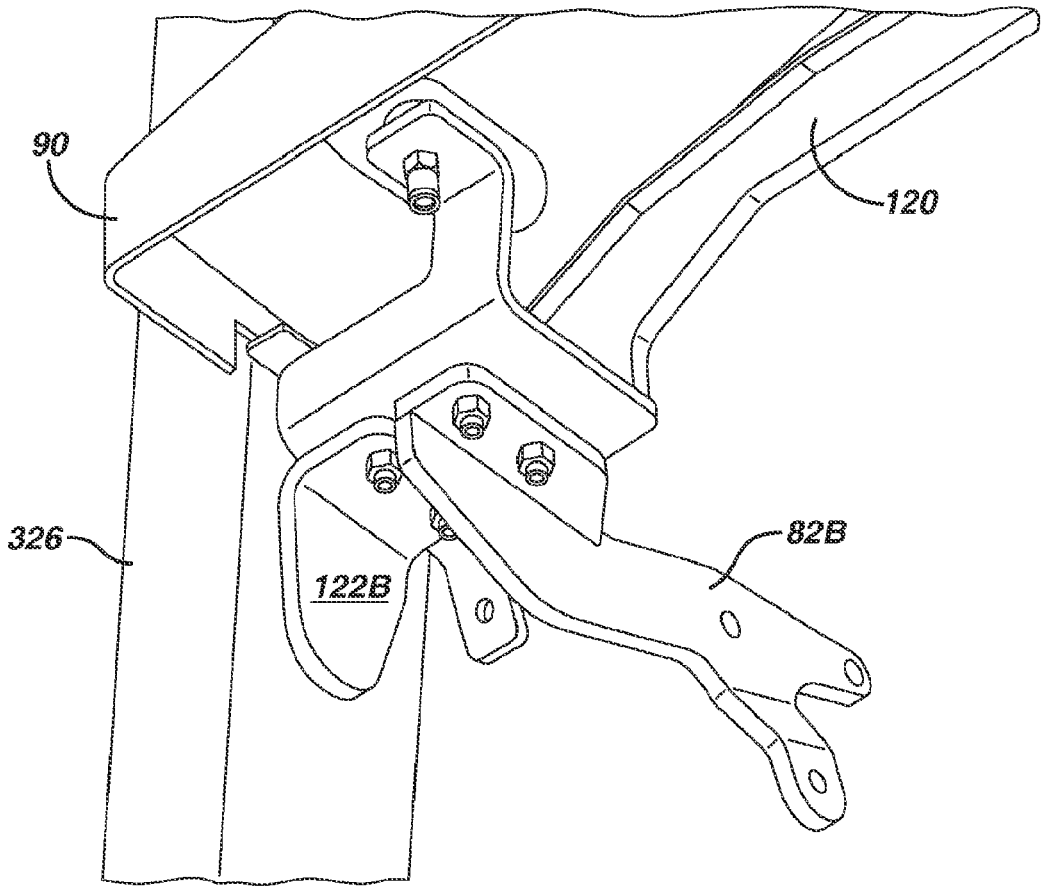
FIG. 6 is a view of the first B-post, a cross member, a rear cover and a fixed bracket coupled to the cross member of the vehicle illustrated in FIGS. 3 and 4.
Figure 9:
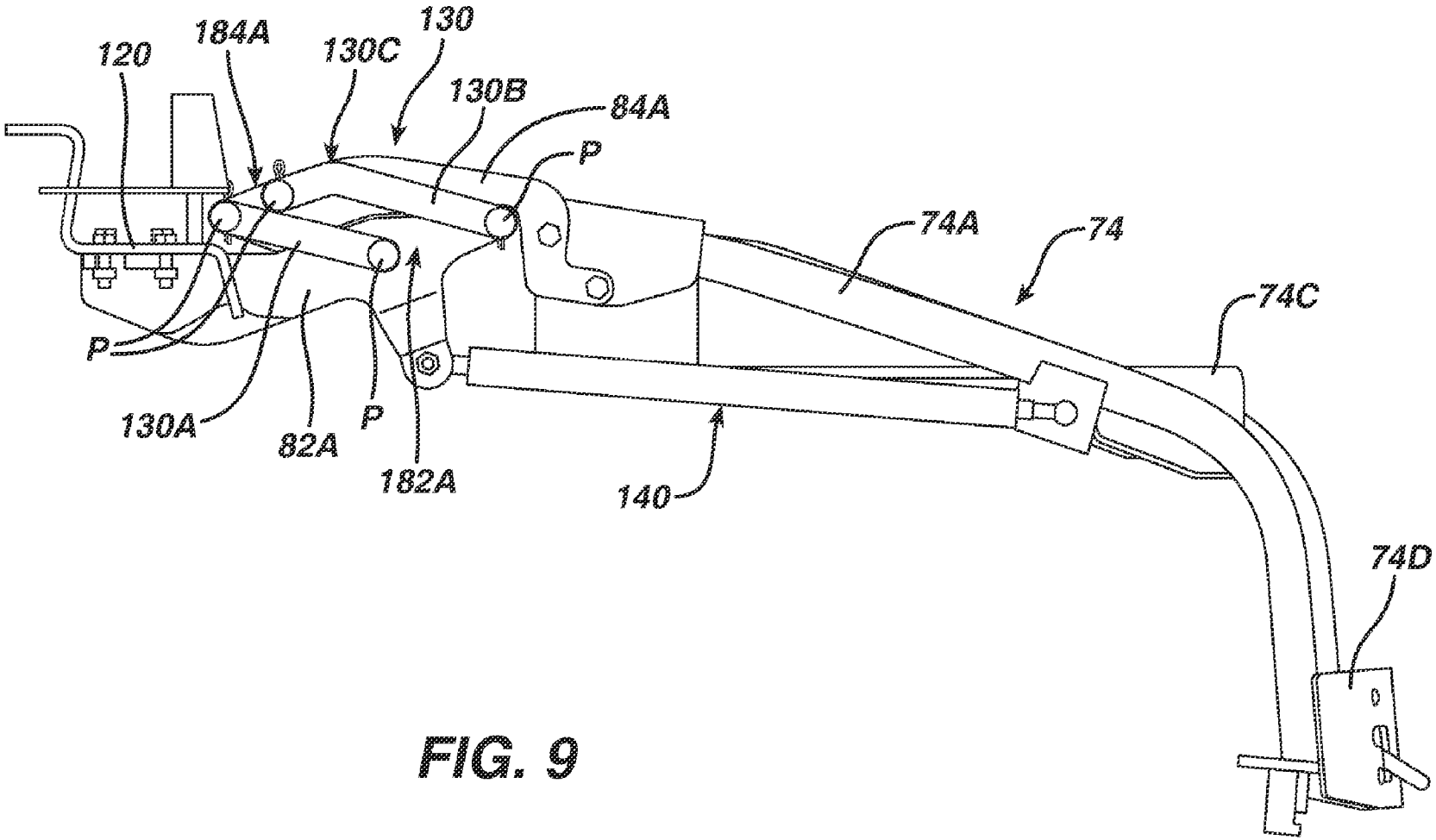
FIG. 9 is a side view of the seat deck assembly, a portion of the vehicle main body, a portion of the structure for movably mounting the seat deck assembly to the vehicle main body, and wherein the cover of the seat deck assembly is removed.
Figure 10:
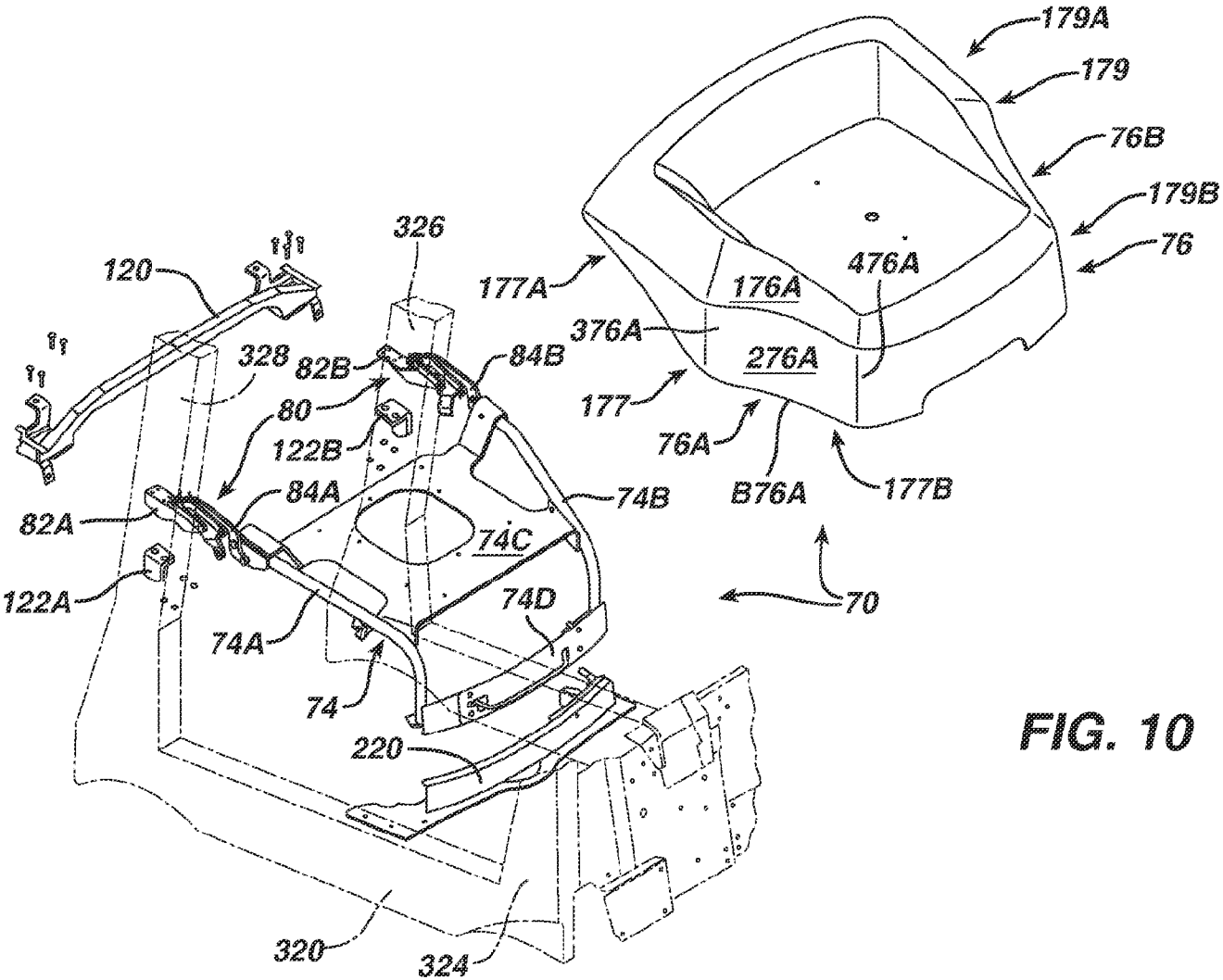
FIG. 10 is an exploded view of the cross member, the seat deck assembly, and the structure for movable mounting the seat deck assembly to the main body of the vehicle illustrated in FIGS. 3 and 4, and with a portion of the vehicle main body shown in phantom.

The seat deck assembly 70 further comprises a frame 74 and a cover 76, see FIGS. 5 and 9-10. In the illustrated embodiment, the frame 74 comprises first and second generally L-shaped tubular members 74A and 74B, a seat support member 74C and a latch support member 74D. The seat 72 and the cover 76 are bolted to the frame 74. Latch or locking structure may be provided on the support member 74D for releasably locking the seat deck assembly 70 to a brace 220 of the main body 320.

In the illustrated embodiment, the structure 80 for movably mounting the seat deck assembly 70 to the main body 20 comprises first and second fixed brackets 82A and 82B, first and second movable brackets 84A and 84B, and first, second, third and fourth four-bar linkages 130-133, see FIGS. 5-10, 10A and 10B. The first and second fixed brackets 82A and 82B are bolted to the cross member 120 of the main body 320, see FIGS. 5, 6 and 10. The first movable bracket 84A is bolted to an outer surface 77A of a plate 77 which, in turn, is welded to the seat support member 74C and the first tubular member 74A, see FIGS. 5 and 7. The second movable bracket 84B is bolted to an inner surface 78A of a plate 78 which, in turn, is welded to the seat support member 74C and the second tubular member 74B, see FIGS. 5 and 8.

Figure 7:
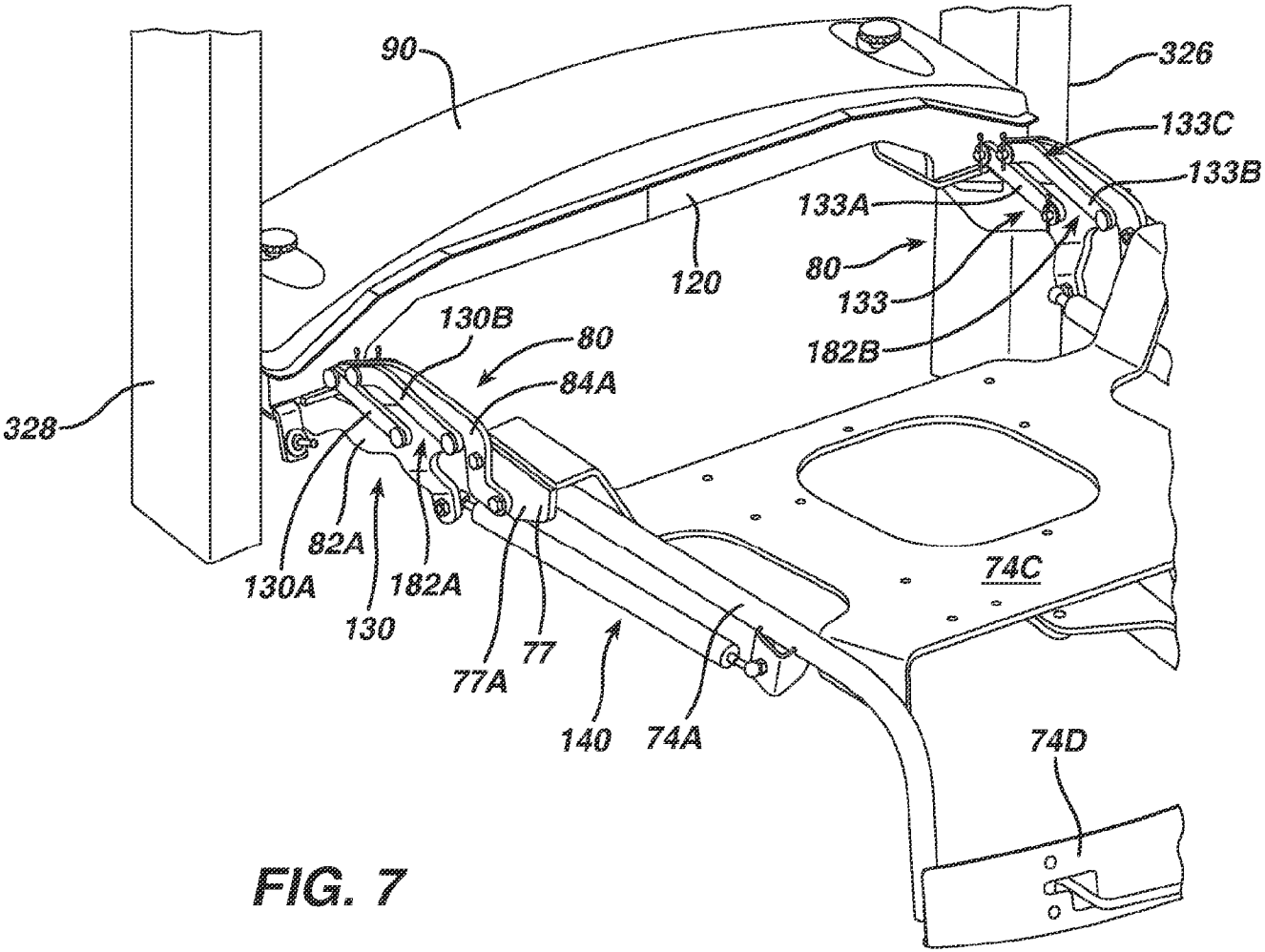
FIGS. 7 and 8 are perspective views of the seat deck assembly and the structure for movable mounting the seat deck assembly to the main body of the vehicle illustrated in FIGS. 3 and 4.
Figure 10A:
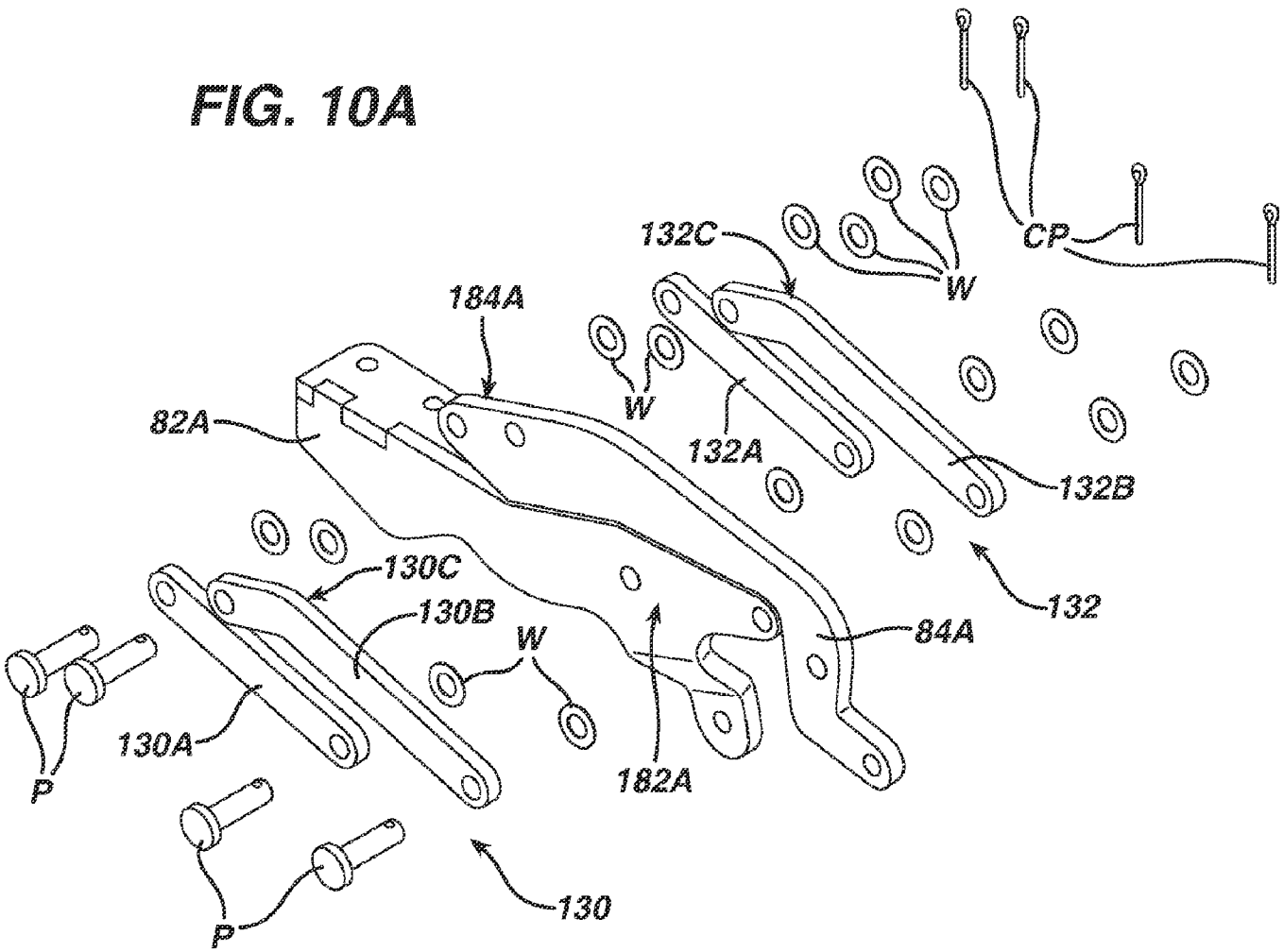
FIG. 10A is an exploded view of the first and third four-bar linkages.

The first four-bar linkage 130 comprise a frame link defined by a portion 182A of the first fixed bracket 82A; a first substantially linear grounded link 130A; a second grounded link 130B having an angled portion 130C; and a coupler link defined by a portion 184A of the first movable bracket 84A, see FIGS. 7, 9 and 10A. Each of the first and second grounded links 130A and 130B is coupled to the frame link 182A and coupler link 184A via pins P, washers W and cotter pins CP or like coupling devices.

Figure 8:
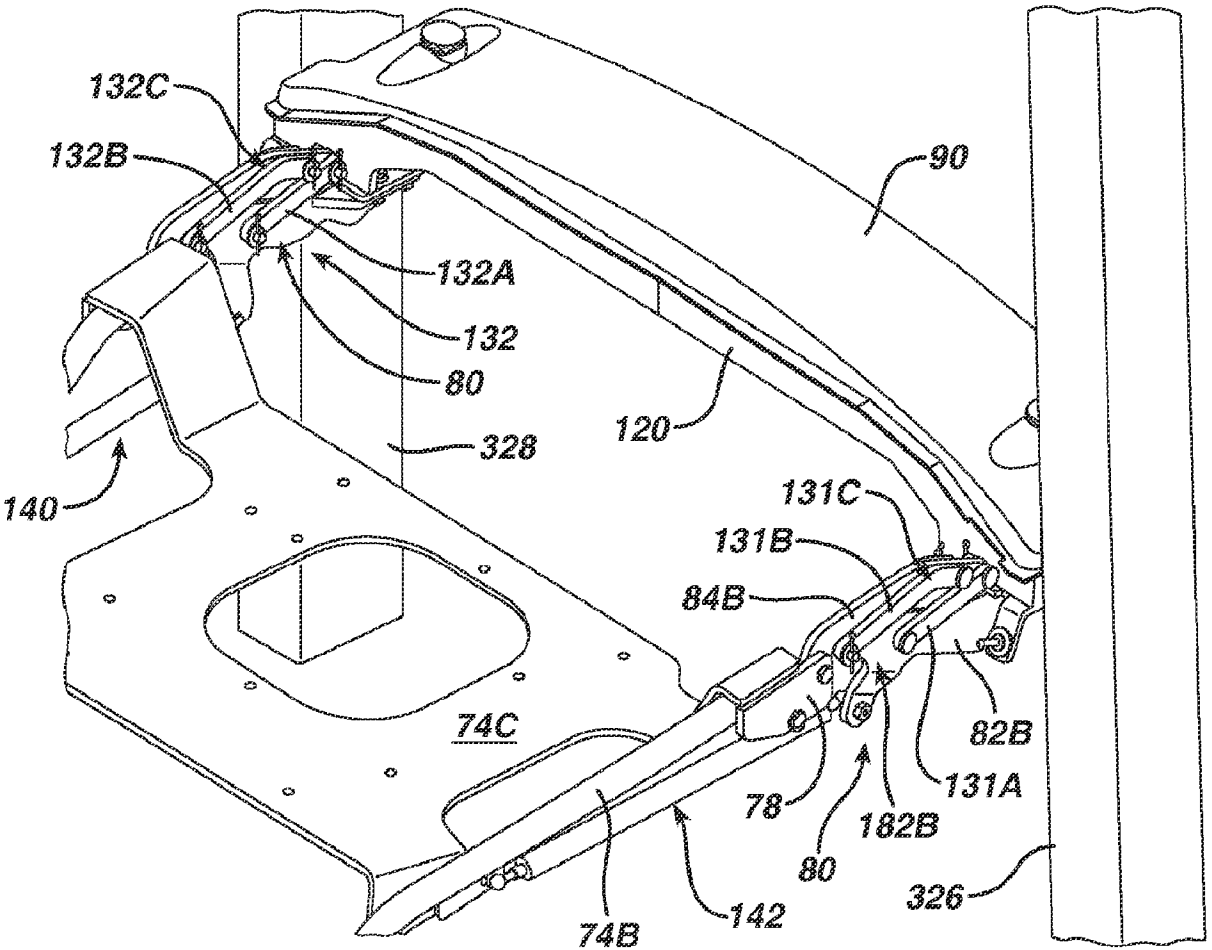
Figure 10B:
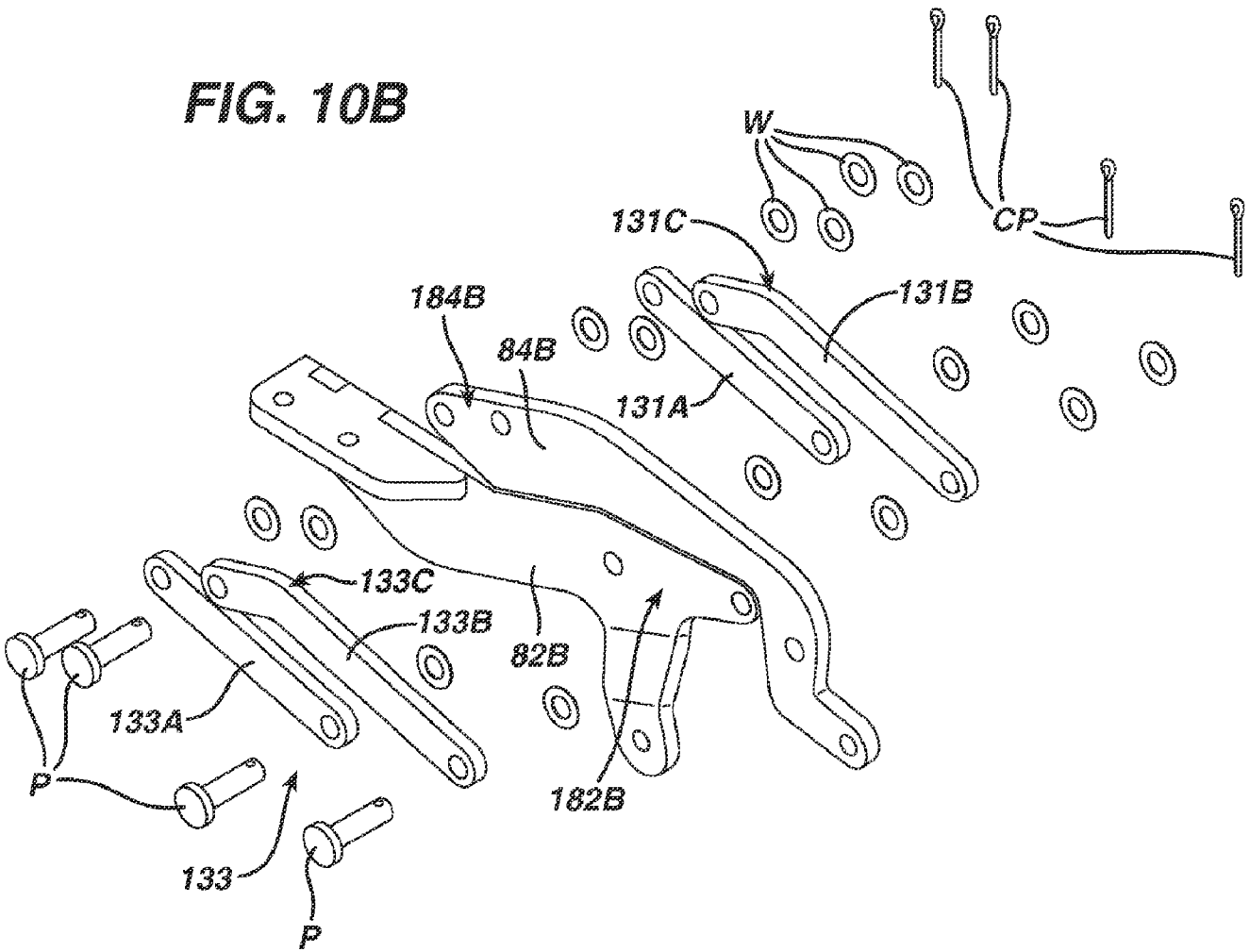
FIG. 10B is an exploded view of the second and fourth four-bar linkages.

The second four-bar linkage 131 comprise a frame link defined by a portion 182B of the second fixed bracket 82B; a first substantially linear grounded link 131A; a second grounded link 131B having an angled portion 131C; and a coupler link defined by a portion 184B of the second movable bracket 84B located between the first and second links 131A and 131B, see FIGS. 8 and 10B. Each of the first and second grounded links 131A and 131B is coupled to the frame link 182B and the coupler link 184B via pins P, washers W and cotter pins CP or like coupling devices.

The third four-bar linkage 132 comprise a frame link defined by the portion 182A of the first fixed bracket 82A; a first substantially linear grounded link 132A; a second grounded link 132B having an angled portion 132C; and a coupler link defined by the portion 184A of the first movable bracket 84A, see FIGS. 8 and 10A. Each of the first and second grounded links 132A and 132B is coupled to the frame link 182A and coupler link 184A via pins P and cotter pins CP or like coupling devices.

The fourth four-bar linkage 133 comprise a frame link defined by the portion 182B of the second fixed bracket 82B; a first substantially linear grounded link 133A; a second grounded link 133B having an angled portion 133C; and a coupler link defined by the portion 184B of the second movable bracket 84B, see FIGS. 5, 7 and 10B. Each of the first and second grounded links 133A and 133B is coupled to the frame link 182B and the coupler link 184B via pins P and cotter pins CP or like coupling devices.

A first piston/cylinder unit 140 is coupled between the first fixed bracket 82A and the seat support member 74C of the seat deck assembly frame 74, while a second piston/cylinder unit 142 is coupled between the second fixed bracket 82B and the seat support member 74C, see FIGS. 5, 7 and 8. The first and second units 140 and 142 function to maintain the seat deck assembly 70 in its fully open position OP when moved to that position. The units 140 and 142 also function to limit the rate at which the seat deck assembly 70 moves downwardly when moved to its closed position CP. It is noted that the fully-extended length of each piston/cylinder unit 140, 142 may limit the angle theta through which the seat deck assembly 70 traverses. For example, with the piston/cylinder units 140 and 142 not connected between the first and second fixed brackets 82A and 82B and the seat deck assembly frame 74, the seat deck assembly 70 may be capable of traversing an angle theta of about 97.5 degrees. However, with the piston/cylinder units 140, 142 connected between the first and second fixed brackets 82A and 82B and the seat deck assembly frame 74, the seat deck assembly 70 may be capable of traversing through an angle theta of only about 92.5 degrees.

As best illustrated in FIGS. 10 and 16-21, the seat deck assembly cover 76 is provided with opposing first and second side portions 177 and 179. Each side portion 177, 179 has a low profile end 177A, 179A near the structure 80 for mounting the seat deck assembly 70 to the main body 20 and a tall profile end 177B, 179B opposite the low profile end 177A, 179A. It is believed that the low profile ends 177A, 179A enhance shoulder and head clearance and general access to the compartment 100 when the seat deck assembly 70 is in its fully open position OP, see FIG. 4.

The tall profile end 177B comprises a first curved recessed or scalloped front section 76A and the tall profile end 179B comprises a second curved recessed or scalloped front section 76B. The first recessed section 76A is defined by upper and lower curved portions 176A and 276A. The lower curved portion 276A is curved inwardly, see FIGS. 17 and 19. The upper curved portion 176A extends upwardly from and at an angle Beta to the lower portion 276A. The angle Beta between the upper and lower portions 176A and 276A varies from a rear end 376A of the first recessed section 76A to a front end 476A of the section 76A, see FIGS. 10, 17 and 18. In the illustrated embodiment, the angle Beta varies from about 121 degrees to about 152 degrees. The upper curved portion 176A is also curved inward. The first section 76A further includes a base $B_{76A}$ having a radius of curvature $R_{76A}$ of about 400 mm.

Figure 16:
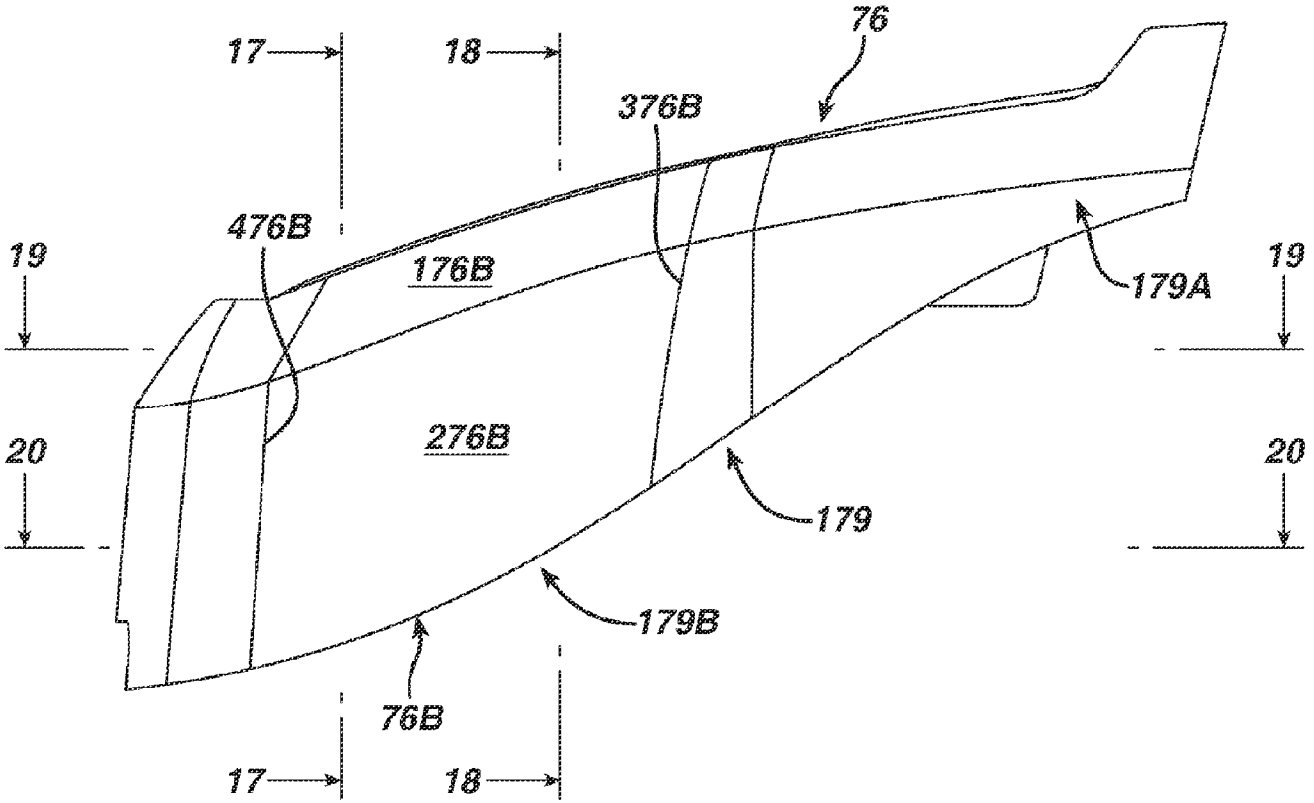
FIG. 16 is a side view of the seat deck assembly cover.
Figure 17:
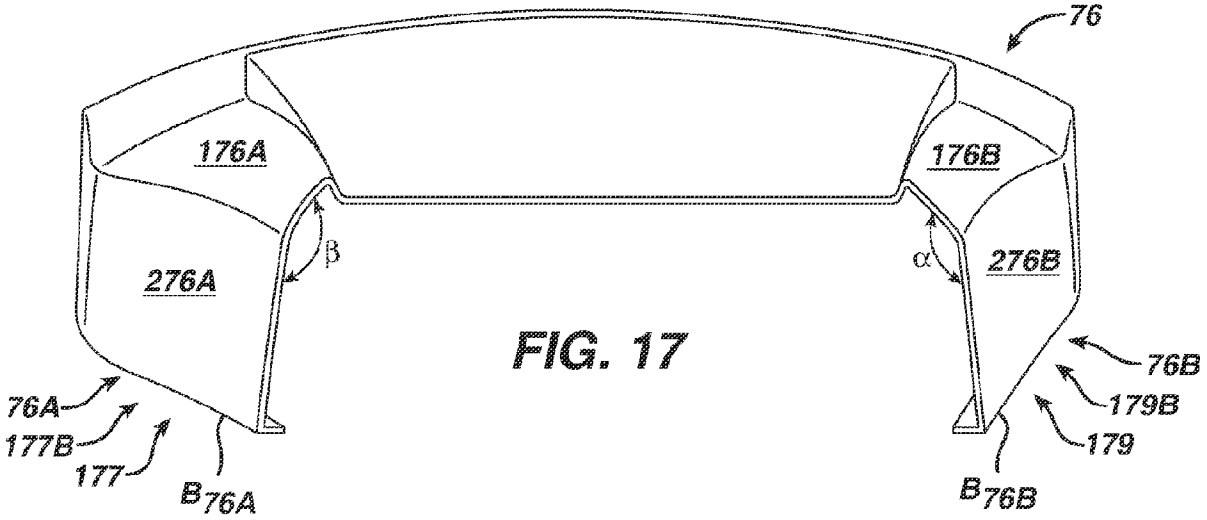
FIG. 17 is a cross sectional view taken along section line 17-17 in FIG. 16.
Figure 18:
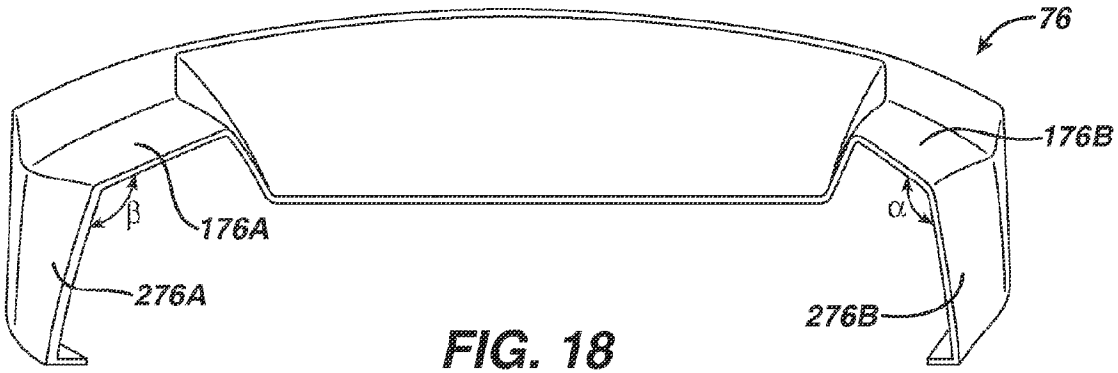
FIG. 18 is a cross sectional view taken along section line 18-18 in FIG. 16.
Figure 20:
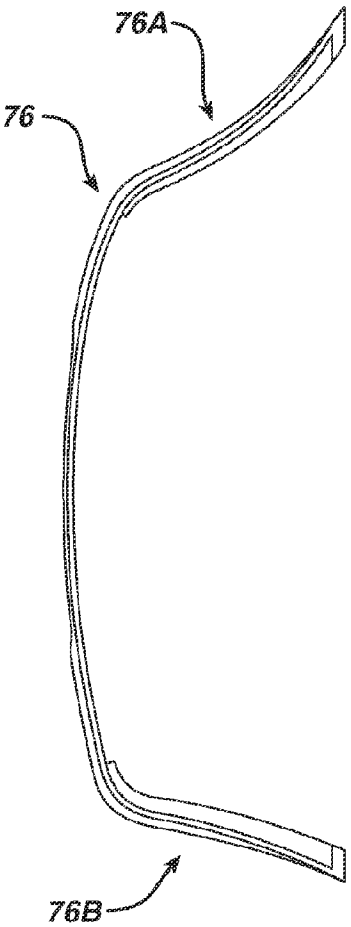
FIG. 20 is a cross sectional view taken along section line 20-20 in FIG. 16.
Figure 19:
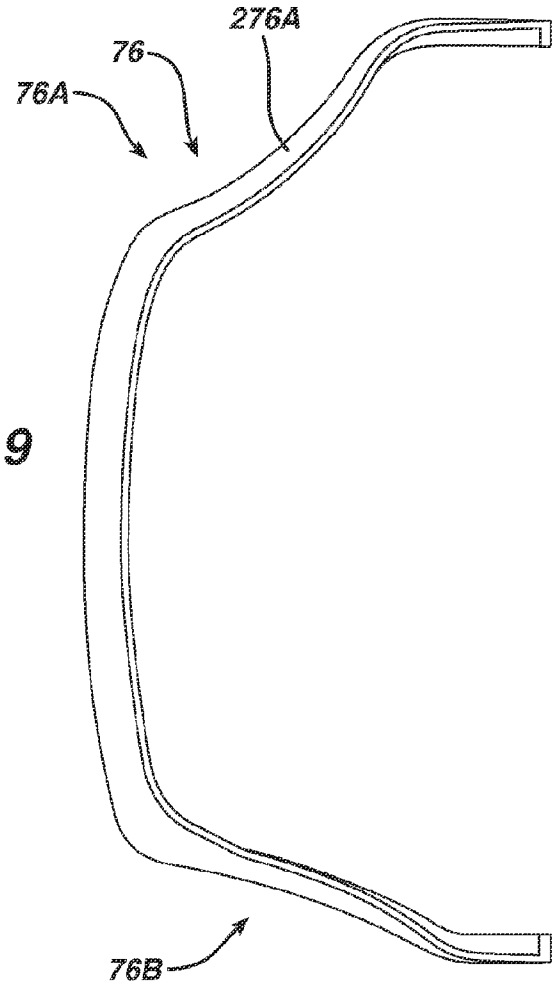
FIG. 19 is a cross sectional view taken along section line 19-19 in FIG. 16.
Figure 21:
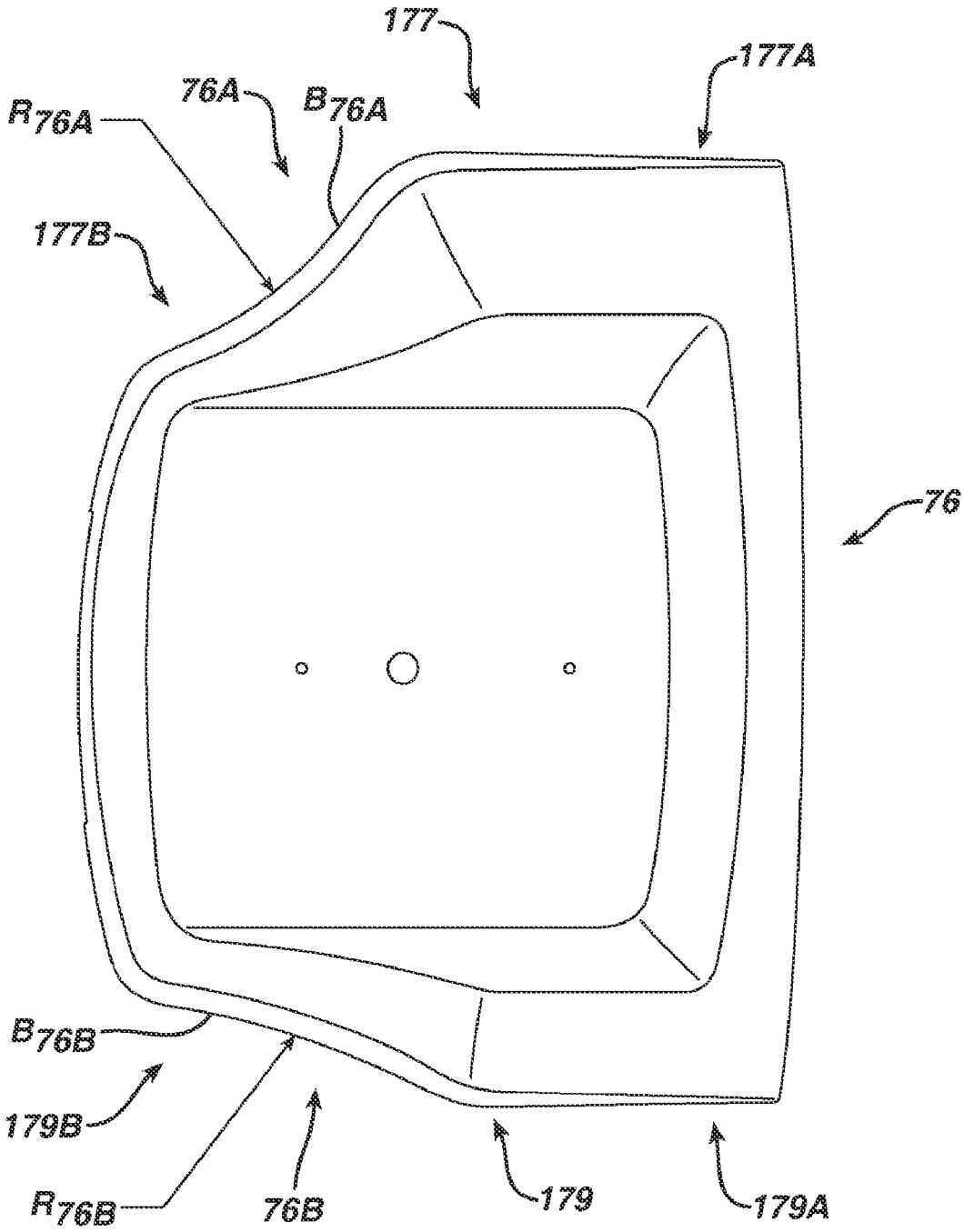
FIG. 21 is a plan view of the seat deck assembly cover.

The second recessed section 76B is defined by upper and lower curved portions 176B and 276B, see FIGS. 16 and 17. The lower curved portion 276B is curved inwardly. The upper curved portion 176B extends upwardly from and at an angle alpha to the lower portion 276B. The angle alpha between the upper and lower portions 176B and 276B varies from a rear end 376B of the second recessed section 76B to a front end 476B of the section 76B, see FIGS. 16-18. In the illustrated embodiment, the angle alpha varies from about 125 degrees to about 138 degrees. The upper curved portion 176B is also curved inward. The second section 76B further includes a base $B_{76B}$ having a radius of curvature $R_{76B}$ of about 850 mm.

The curved recessed sections 76A and 76B allow for improved operator ingress and egress to the operator compartment 40. Also, when an operator rotates the seat 72 to allow the operator to more easily view a path of travel when the truck 10 is driven in reverse, a corresponding one of the curved recessed sections 76A and 76B provides a comfortable location for the operator to drape his/her legs within the operator compartment 40 while not moving his/her feet from their normal location within the operator compartment 40. Hence, at least one of the recessed sections 76A and 76B provides for improved operator comfort when the seat 72 is rotated.

It is also contemplated that a cover assembly not including a seat may be provided for use in a materials handling vehicle. The cover assembly may be constructed in a similar manner to the seat deck assembly so as to cover at least a portion of a compartment positioned beneath it, and traverse an angle theta preferably greater than about 90 degrees.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A materials handling vehicle comprising:

a main body;

a seat deck assembly including an operator seat and a compartment cover;

a substantial portion of said compartment cover positioned below said operator seat; and structure *comprising at least one four bar linkage including a link having an angled portion* for movably mounting said seat deck assembly to said main body such that said seat deck assembly moves relative to said main body along a varying radius path.

2. A materials handling vehicle as set out in claim 1, wherein said structure for movably mounting said seat deck assembly to said main body comprises:

at least one fixed bracket mounted to said main body; *and* at least one movable bracket coupled to said seat deck assembly[; and at least one linkage assembly coupled to said fixed and movable brackets].

[3. A materials handling vehicle as set out in claim 2, wherein said at least one linkage assembly comprises at least one four-bar linkage.]

4. A materials handling vehicle as set out in claim [3] *2*, wherein said four-bar linkage comprises a frame link defined by a portion of said fixed bracket; a first substantially linear grounded link; [a second grounded] *said* link having [an] *said* angled portion *and defining a second grounded link*; and a coupler link defined by a portion of said movable bracket, each of said first and second grounded links being coupled to said frame and coupler links.

5. A materials handling vehicle as set out in claim 2, wherein said main body comprises:

a base;

first and second B-posts fixedly coupled to said base; and a cross member extending between and fixedly coupled to said first and second B-posts.

6. A materials handling vehicle as set out in claim 5, wherein said at least one fixed bracket comprises first and second fixed brackets fixed to said cross member, said at least one movable bracket comprises first and second movable brackets coupled to said seat deck assembly; and said at least one *four-bar* linkage [assembly] comprises first and second [linkage assemblies] *four-bar linkages*, said first *four-bar* linkage [assembly] being coupled to said first fixed bracket and said first movable bracket and said second *four-bar* linkage [assembly] being coupled to said second fixed bracket and said second movable bracket.

7. A materials handling vehicle as set out in claim 6, wherein said seat deck assembly further comprises a frame coupled to said first and second movable brackets, said cover coupled to said frame and wherein said operator seat is coupled to said frame.

8. A materials handling vehicle as set out in claim 1, further comprising a fork assembly coupled to said main body.

9. A materials handling vehicle as set out in claim 1, wherein said [structure comprises] at least one four-bar linkage [which] provides for movement of said seat deck assembly through an angle greater than about 87 degrees.

10. A materials handling vehicle as set out in claim 1, wherein said [structure comprises] at least one four-bar linkage comprising a first element that moves through an angle greater than about 45 degrees relative to a second element of said at least one four-bar linkage.

[11. A materials handling vehicle as set out in claim 1, wherein said structure comprises at least one four-bar linkage.]

12. A materials handling vehicle comprising:

a main body;

a seat deck assembly including an operator seat and a compartment cover; and structure including at least one four-bar linkage *including a link having an angled portion* for movably mounting said seat deck assembly to said main body such that said at least one four-bar linkage enables said seat deck assembly to traverse through an angle greater than about 87 degrees when traveling between closed and open positions so as to allow optimal access to a compartment positioned beneath said seat deck assembly.

13. A materials handling vehicle as set out in claim 12, wherein said structure for movably mounting said seat deck assembly to said main body further comprises:

at least one fixed bracket mounted to said main body; and at least one movable bracket mounted to said seat deck assembly.

14. A materials handling vehicle as set out in claim 13, wherein said at least one four-bar linkage allows said seat deck assembly to traverse through an angle from about 92 degrees to about 99 degrees when moving from a closed position to an open position.

15. A materials handling vehicle as set out in claim 13, wherein said four-bar linkage comprises a frame link defined by a portion of said fixed bracket; a first substantially linear grounded link; [a second grounded] *said* link having [an] *said* angled portion *and defining a second grounded link*; and a coupler link defined by a portion of said movable bracket, each of said first and second grounded links being coupled to said fixed and coupler links.

16. A materials handling vehicle as set out in claim 13, wherein said seat deck assembly further comprises a frame coupled to said at least one movable bracket, said cover coupled to said frame and wherein said operator seat is coupled to said frame.

17. A materials handling vehicle as set out in claim 16, wherein said cover has side portions which are low in profile height near an end of said frame coupled to said at least one movable bracket and are tall in profile height near an end of said frame opposite said end coupled to said at least one movable bracket.

18. A materials handling vehicle as set out in claim 12, wherein said at least one four-bar linkage comprises a first element that moves through an angle greater than about 45 degrees relative to a second element of said at least one four-bar linkage.

19. A materials handling vehicle comprising:

a main body;

a seat deck assembly including a frame, a cover coupled to said frame and an operator seat;

structure for mounting said seat deck assembly to said main body; and wherein said cover of said seat deck assembly includes a curved recessed front section extending between upper and lower surfaces and is recessed inwardly towards a center of said cover, and said lower surface is spaced further away from said center of said cover than said upper surface and said lower surface is located nearer to said main body than said upper surface.

20. A materials handling vehicle as set out in claim 19, wherein said curved section is defined by upper and lower inwardly curved portions, wherein the upper portion extends at an angle to the lower curved portion.

21. A materials handling vehicle as set out in claim 20, wherein said seat deck assembly traverses through an angle from about 92 degrees to about 99 degrees when traveling between closed and open positions so as to allow maximum access to said compartment positioned beneath said cover assembly.

22. A materials handling vehicle comprising:

a main body having a compartment;

a cover assembly for said compartment; and structure for movably mounting said cover assembly to said main body such that said cover assembly moves relative to said main body along a varying radius path *through an angle greater than about 90 degrees when traveling between closed and open positions so as to allow maximum access to said compartment positioned beneath said cover assembly*.

23. A materials handling vehicle as set out in claim 22, wherein said structure for movably mounting said cover assembly to said main body comprises:

at least one fixed bracket mounted to said main body;

at least one movable bracket mounted to said cover assembly; and at least one four-bar linkage assembly coupled to said fixed and movable brackets.

24. A materials handling vehicle as set out in claim 22, wherein said structure comprises at least one four-bar linkage.

* * * * *